Figure 1:
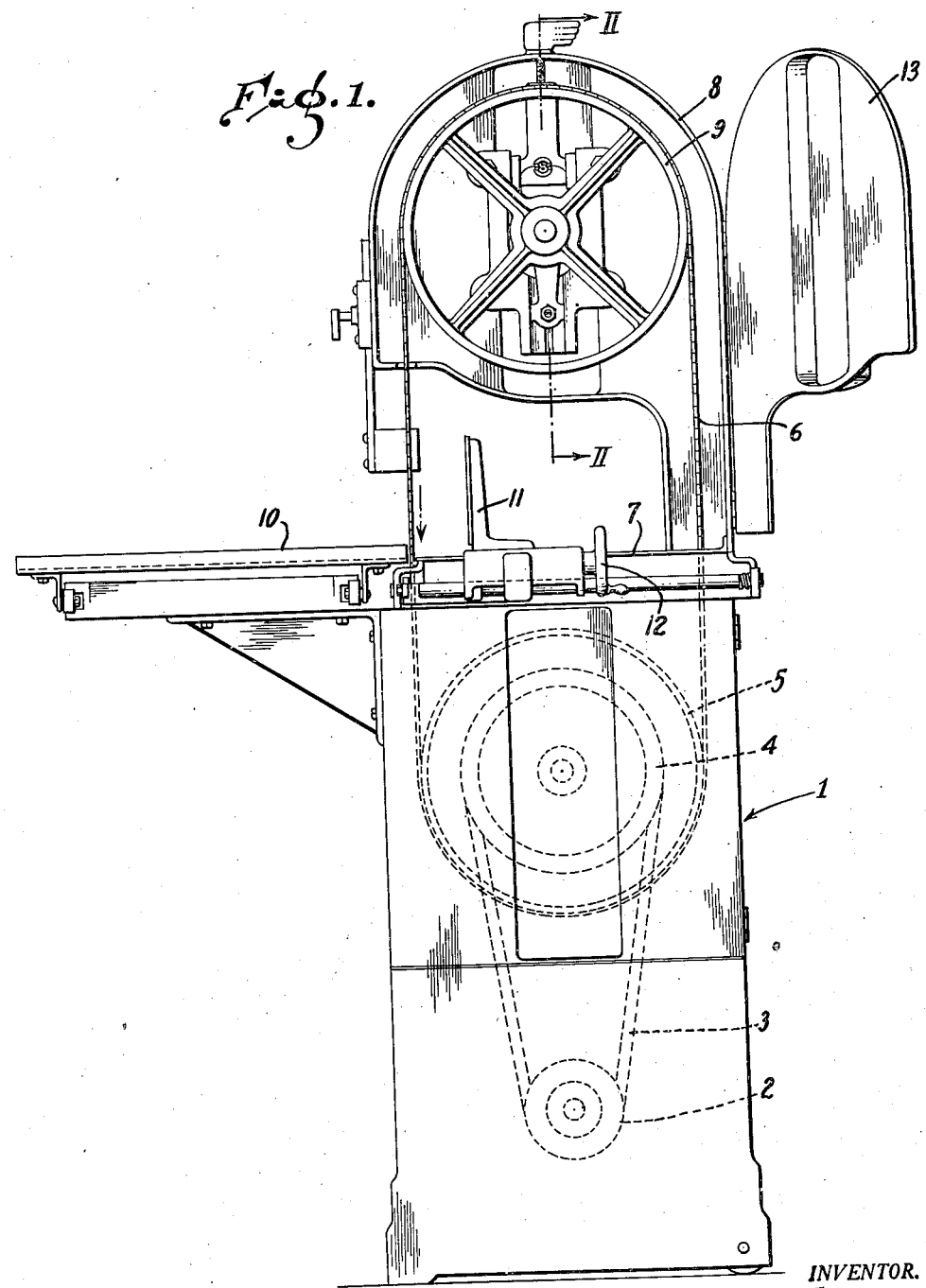

Sept. 13, 1949.　　　　　W. LASAR　　　　　2,481,675
ADJUSTABLE PULLEY MOUNTING FOR BAND SAWS.
Original Filed Feb. 18, 1943　　　　　　　　2 Sheets-Sheet 1

INVENTOR.
WILLIAM LASAR,
BY
ATTORNEY

Sept. 13, 1949.　　　　　W. LASAR　　　　　2,481,675
ADJUSTABLE PULLEY MOUNTING FOR BAND SAWS
Original Filed Feb. 18, 1943　　　　　2 Sheets-Sheet 2
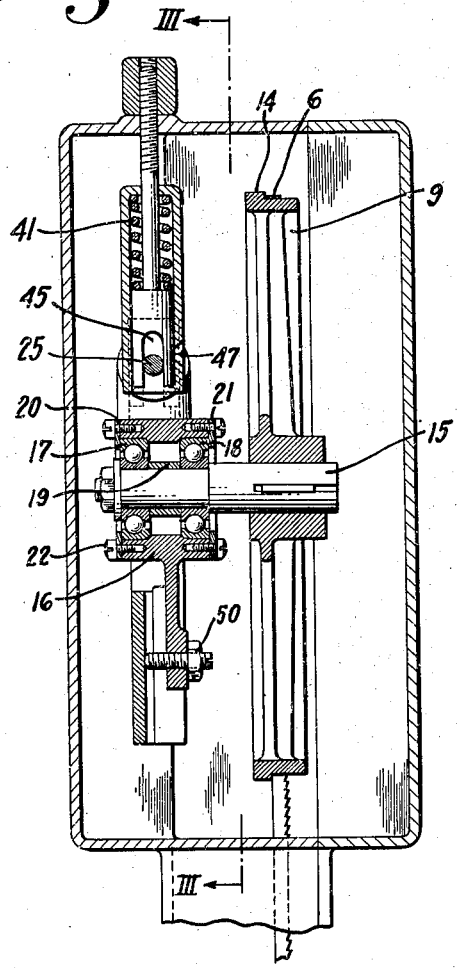
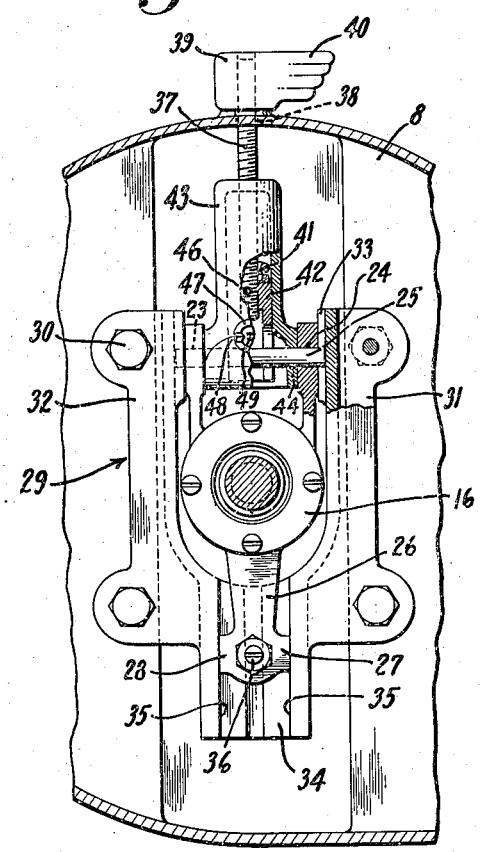
WILLIAM LASAR,
INVENTOR.
BY
ATTORNEY Patented Sept. 13, 1949

2,481,675

UNITED STATES PATENT OFFICE 2,481,675

ADJUSTABLE PULLEY MOUNTING FOR BAND SAWS

William Lasar, Los Angeles, Calif.

Original application February 18, 1943, Serial No. 476,264. Divided and this application March 5, 1945, Serial No. 581,039

4 Claims. (Cl. 143—27)

My invention relates to adjustable pulley mountings and has particular reference to a mounting for one of a pair of pulleys over which an endless belt or band is trained.

This application is a division of my copending application Serial No. 476,264, filed February 18, 1943 and entitled "Meat cutting machine", and issued July 31, 1945 as Patent No. 2,380,700.

In various types of machinery which include as a part thereof an endless band trained over a pair of spaced pulleys, for example, a band saw, it is desirable that the amount of tension exerted upon the band or belt be fixed at some predetermined value so that the person operating the machine may readily install or replace the bands with assurance that the proper amount of tension will be exerted thereon. This is particularly true of machines such as band saws employed for cutting meat wherein it is necessary to frequently remove the band or saw for the purposes of cleaning the band and the pulleys.

It is therefore an object of my invention to provide a pulley mounting for such machines, in which one of the pulleys is provided with an adjustable mounting apparatus by which the pulley may be moved toward the other pulley for the purpose of permitting removal and replacement of the band and wherein a simple operation of tightening an adjusting device will move the movable pulley away from the other pulley of the system until the desired amount of tension is exerted upon the band.

Another object of my invention is to provide a pulley mounting of the character described wherein the forces urging the movable pulley away from the other pulley of the system are imposed through a resilient mechanism which will positively move the pulley toward its adjusted position until the desired tension is imposed upon the band and thereafter the adjusting mechanism will yield if any further tightening efforts are exerted so as to maintain the tension in the band at a predetermined fixed value.

Another object of my invention is to provide a pulley mounting of the character described wherein the pulley mounting is provided with an indicated means which will indicate when the proper or predetermined amount of tension has been exerted upon the band.

Another object of my invention is to provide a pulley mounting of the character described wherein the pulley shaft is mounted upon a movable carriage adapted to be adjusted about an axis transverse to the axis of the pulley shaft to accurately align the pulley mounted upon the shaft in the same vertical plane as the plane of the other pulley of the system.

Other objects and advantages of my invention will be apparent from a study of the following specifications, read in connection with the accompanying drawings, wherein Fig. 1 is an elevational view of one form of endless band and pulley system with which my pulley mounting may be employed, the system being shown as embodied in a band saw adapted for the cutting of meats;

Fig. 2 is a detail vertical sectional view taken along line II—II of Fig. 1; and Fig. 3 is a detail sectional view taken along line III—III of Fig. 2.

Referring to the drawings, I have illustrated my pulley mounting as being embodied in a band saw structure adapted for the cutting of meats, the saw structure comprising a base 1 in which is mounted a suitable motor (not shown) for driving a pulley 2 coupled by means of a belt 3 to a second pulley 4 which in turn is fixed to a band pulley 5, over which the band saw 6 is trained, the pulley 5 being mounted in the base 1 in any suitable manner such that it may rotate but will have no vertical or lateral movement.

Mounted upon the base 1 or formed integrally therewith is a cutting table 7 from which rises an upper pulley support and housing 8, within which is mounted a second or movable pulley 9, about which the upper loop of the endless band saw 6 passes. The pulley 9 is mounted upon my mounting means in such manner that it may be readily moved in a vertical direction toward the stationary pulley 5 to loosen the band 6 to permit its removal and replacement and thereafter the pulley 9 is moved away from the fixed pulley 5 to tighten the band and to exert the desired tension upon the band.

The band saw structure also includes a movable table 10 upon which a piece of meat or other article to be cut by the band saw may be placed and moved toward the band in performing a cutting operation while, if desired, a gauge 11 may be provided on the table 7 to constitute an abutment against which a piece of meat may be pressed when it is desired to cut a number of slabs of equal thickness from the piece of meat on the table 10, the gauge 11 being readily adjustable by means of a suitable hand wheel 12, the construction and operation of the gauge being illustrated, described and claimed in my copending application hereinbefore referred to.

The housing 8 may be constructed in any shape though I prefer to employ a shape which will completely enclose the pulley 9 and its mounting mechanism, the housing 8 being provided with a suitable cover 13 which may be hinged or otherwise movably secured upon the housing 8 so as to permit ready access to the interior of the housing for the operations of removing and replacement of the band 6 and for the ready cleaning of the pulley and housing when the band is employed for the cutting of meats or other decomposable material.

The pulley 9 is preferably provided upon its outer periphery with a shallow flange 14 against which the rear edge of the saw 6 may bear, the pulley 9 being mounted upon a shaft 15 which is in turn rotatably mounted upon a carriage 16 constituting a part of my pulley mounting. The shaft 15 may be journaled upon the carriage 16 in any suitable manner though I prefer to employ a pair of spaced ball bearings 17 and 18 within the carriage 16 spaced from each other along the shaft 15 by means of a spacer sleeve 19, the bearing being held in place by means of a pair of cover plates 20 and 21 secured to the carriage 16 as by means of screws 22.

By referring particularly to Figs. 1 and 3, it will be observed that the carriage 16 is substantially Y-shaped, the two upper legs of the Y extending in substantially parallel relation to each other from the portion of the carriage which houses the bearings 17 and 18, there being aligned transverse bores 23 and 24 extending through the upper ends of the upper legs of the Y through which a pin or rod 25 may pass. The lower leg 26 of the Y extends downwardly below the bearing housing and is preferably provided with a pair of laterally extending ears 27 and 28 adjacent its lower end.

The mounting member 29 secured to the housing 8, as by means of bolts or studs 30, provides a vertically extending trackway along which the carriage may move and be guided. The mounting member 29, being of general Y-shaped configuration, provides a pair of upwardly extending arms 31 and 32, the parallel inner surfaces of which are formed with open-ended channel-shaped grooves or slots 33 defining opposed parallel trackways into which the ends of the cross pin 25 are received, the inner surfaces of the arms 31 and 32 providing bearing surfaces along which the upper legs of the Y-shaped carriage are guided in a vertical direction, while the engagement of the cross pin 25 in the channel slots 33 prevents any forward or rearward movement of the carriage.

The lower portion of the mounting member 29 is provided with a vertically extending wide groove 34, the side edges 35 of which engage the ends of the ears 27 and 28 to guide the lower leg of the carriage and to prevent transverse movement. The groove 34, however, permits a forward and backward movement of the lower leg of the carriage so that the carriage in effect may be given a partial rotation about an axis defined by the cross pin 25. Hence by adjusting a tilting screw 36 inwardly and outwardly with respect to the carriage leg 26, the carriage may be readily tilted to any position, disposing the plane of rotation of the pulley 9 in alignment with the plane of rotation of the fixed pulley 5 or, in other words, the axis of rotation of the shaft 15 may be adjusted until it is parallel to the axis of rotation of the fixed pulley 5.

In order to tighten and loosen the band 6, the carriage is moved bodily up and down in the trackway formed by the mounting member 29 by any suitable means, the adjusting means illustrated herein comprising a screw 37 which extends through an aperture 38 in the upper wall of the housing 8, an adjusting nut 39 engaging the upper or exposed end of the screw 37 so that rotation of the nut 39, as by means of grasping a wing 40 formed thereon, will move the screw 37 vertically to either tighten or loosen the band 6. The screw 37 is preferably coupled to the carriage 16 through a resilient connection illustrated as a spring 41 which is interposed between a head 42 secured to the screw 37 and a coupling member 43 which is in turn pivotally connected to the cross pin 25.

In the form illustrated herein, the coupling member 43 is constructed as a substantially T-shape, the cross bar of the T fitting between the two upper legs of the carriage 16 and having a transverse bore 44 extending therethrough, through which the cross pin 25 extends to make a pivotal connection between the coupling member 43 and the carriage 16. The vertical leg of the T-shape is hollow to provide a chamber within which the spring 41 is received and to guide the head 42 of the screw 37 as the screw is moved up and down. The head 42 may be formed of any desired construction, that illustrated herein comprising a tubular member having a pair of aligned transverse slots 45, dividing the lower end of the head 42 into a pair of legs which straddle the pin 25. The screw 37 is secured to the head either by threading the same upon the screw or by means of a coupling pin 46 extending through these members. I prefer to use both the threaded connection and the pin since it is desirable that rotational movement between the screw 37 and the head 42 be prevented.

From the foregoing it will be apparent that by loosening the nut 39 the pulley carriage will move bodily downwardly, thereby loosening the band 6, permitting its ready removal and replacement, while tightening the nut 39 will first bodily move the carriage upwardly, tightening the band until the tension exerted on the band is equal to the force required to compress the spring 41. Thereafter any additional tightening of the nut 39 will merely compress the spring without further movement being imparted to the carriage. By selecting the spring of any desired strength, the tension which will be exerted upon the band 6 will be maintained at a fixed value.

To indicate to a person operating the machine when the nut has been tightened sufficiently to exert this predetermined tension upon the band 6, I provide an indicator which includes an opening 47 in the front surface of the coupling member 43, through which the head 42 of the screw 37 may be observed and by providing appropriate marks 48 and 49 upon the coupling member 43 and the head 42 respectively, which will be moved into alignment with each other immediately after the spring 41 starts to compress, the observed alignment of these marks will inform the person operating the machine that a sufficient amount of tightening of the nut 39 has been accomplished. If desired, the index mark 48 may be formed as a V-groove in the walls of the coupling member 43 surrounding the aperture or opening 47.

It will therefore be observed that I have provided a mounting for the movable pulley 9 in which the axis of rotation of the pulley shaft 15 may be readily adjusted in parallel relation to the axis of rotation of the fixed pulley 5 by adjusting the screw 36 which may be locked in any adjusted position by means of a lock nut 50 while the pulley 9 may be bodily moved toward and away from the fixed pulley 5 by the mere rotation of the nut 39. Interposing the spring 41 between the carriage and the screw 37 insures that when the nut 39 is tightened to tighten the band the tension exerted upon the band will always be at a fixed or predetermined value, greatly facilitating the frequent replacement of the band, as is required by the necessity for frequent cleaning of the band and its pulleys.

While I have shown and described the preferred embodiment of my invention, I do not desire to be limited to any of the details of construction described and shown herein, except as defined in the appended claims.

I claim:

1. In a pulley mounting for use with a system including an endless band trained over a pair of pulleys, a pulley shaft, a carriage mounting the pulley shaft, said carriage including a pair of spaced parallel legs, a support, means on said support defining a pair of opposed channel-shaped trackways along which the carriage may be moved, means for moving said carriage along said trackway to tighten the band including screw means engageable with said support, coupling means connected to said screw means and having one of its ends disposed between the legs of said carriage, a pin of round cross section extending through said coupling means and the legs of said carriage and engageable in the channels of said trackways to pivotally connect the coupling means and said carriage, and means on said carriage spaced from said legs engageable with said support to tilt said carriage about said pin to adjustably fix the axis of rotation of said shaft.

2. In a pulley mounting for use with a system including an endless band trained over a pair of pulleys, a pulley shaft, a carriage mounting the pulley shaft, a stationary support, a pair of spaced parallel vertically extending open-ended channel-shaped trackways on said support, a guide on each side of said carriage extending into said channels to guide said carriage in vertical movements, said guides being rotatable in said channels and having rounded surfaces bearing against the trackways permitting tilting of said carriage, screw means suspending said carriage from said support for vertical movement relative thereto, and tilting means on said carriage spaced vertically from said guide means and adjustable toward and away from said support for tilting said carriage to align the pulley with the plane of movement of the band.

3. In a pulley mounting for use with a system including an endless band trained over a pair of pulleys, a pulley shaft, a carriage mounting the pulley shaft, said carriage including a pair of spaced parallel legs, a support, a parallel pair of opposed channel-shaped trackways formed on the support, the outer edges of the channels closely engaging the outer edges of the carriage legs, a hollow coupling having one end disposed between the carriage legs, a pin of round cross section extending through said coupling and through the legs of said carriage and slidable in the channels of said trackways, a tilting means acting between the carriage and the support for tilting the carriage about the pin, a compression spring disposed within the hollow coupling, a headed screw passing through the spring and through the hollow coupling to compress the spring between its head and the coupling, nut means disposed on the other end of the screw for engagement with the support, whereby the carriage may be manually moved upwardly and downwardly on the trackways, and a sight opening in said coupling through which said screw may be observed to permit observation of the yielding of said spring to determine the amount of tensioning that has been imposed upon the band.

4. A pulley mounting as defined in claim 3 wherein the side opening is provided with an index mark and the screw is provided with an index mark so that a ready observation may be had of a predetermined amount of tensioning of the band as a function of the compression of said spring.

WILLIAM LASAR.

REFERENCES CITED

The following references are of record in the file of this patent:

UNITED STATES PATENTS

| Number | Name | Date |
|---|---|---|
| 120,949 | Doane et al. | Nov. 14, 1871 |
| 1,169,487 | Jackson | Jan. 25, 1916 |
| 1,392,990 | Vaughan | Oct. 11, 1921 |
| 1,499,124 | Reichmann | June 24, 1924 |
| 2,101,343 | Ponton | Dec. 7, 1937 |
| 2,274,923 | Hedgpeth | Mar. 3, 1942 |

FOREIGN PATENTS

| Number | Country | Date |
|---|---|---|
| 722,001 | France | Dec. 28, 1931 |